United States Patent Office

3,347,743
Patented Oct. 17, 1967

3,347,743
METHOD OF TREATING BOVINE MASTITIS
Gerald L. Reuter, Ashland, Ohio, and George N. Hill, Bristol, Tenn., assignors to Richardson-Merrell Inc., New York, N.Y., a corporation of Delaware
No Drawing. Filed Jan. 3, 1964, Ser. No. 335,665
6 Claims. (Cl. 167—53.2)

This invention relates to the treatment of mastitis, and more particularly, to the treatment of bovine mastitis with novel compositions and devices.

Mastitis is an inflammation of the mammary glands. Bovine mastitis occurs wherever dairy cattle are kept. It has been estimated that economic losses caused by bovine mastitis amount to over one hundred million dollars annually in the United States. These losses are caused chiefly by a decrease in milk production and the loss of milk that must be discarded because it is not fit for human use. Frequently, the infected cow must be removed from the herd and dried up. In extreme cases the animal becomes so severely infected that she dies.

Most cases of bovine mastitis are caused by bacterial infection of the mammary gland. A variety of microorganisms cause the condition. The most frequently found microorganism in cases of bovine mastitis are *Streptococci*, particularly *Streptococcus agalactiae* which propagates only in the udder. *Micrococci* such as *Micrococcus pyogenes* (*Staphylococcus aureus*) are also recognized as a cause of bovine mastitis. Still other infectious microorganisms such as *Corynebacterium pyogenes*, *Escherichia coli*, *Pseudomonas aeruginosa*, *Salmonella enteritidis*, *Clostridium perfringens*, and others are also believed to be responsible for cases of mastitis. Mastitis may exist in acute or chronic forms, and often effects the cow during its entire life unless properly treated.

Treatment of infectious mastitis and control of the infection has been by means of antibacterial agents such as acriflavine, iodine, sulfa drugs, antibiotics, nitrofurans, hexamethylenetetramine, and steroids such as cortisone. Although some cases are successfully treated by massive intramuscular injections of an antibacterial agent, the usual treatment has been to infuse the mammary gland with a solution or suspension of an antibacterial agent. This is accomplished by injecting the medicament in amounts usually less than 50 milliliters into the lactiferous sinus (milk cistern) through the teat with a syringe. The treatment is repeated from day to day as may be necessary.

The method of treatment of bovine mastitis in accordance with the present invention involves the inflation of the udder with a relatively large volume of an inert gas having suspended in it micronized particles of a suitable antibacterial agent or mixtures thereof. Micronized steroids and other desired forms of medication may also be infused into the udder as an aerosol through the teat with the antibacterial if desired.

It has been found that as much as 3 liters of an inert gas, such as carbon dioxide, can be infused into one quarter of the udder of a cow from a pressure vessel in which the gas is maintained at an initial pressure of 90 pounds per square inch without indication of damage to the mammary gland. Micronized particles of the medicinal agents are thereby distributed over a large surface area of the bovine mammary gland where bacteria causing mastitis exist.

The particle size of the particular medicament used may vary from about 0.005 micron to 5 microns. The larger particles may be indicated for the purpose of lengthening the medicating time and the smaller particles for more thorough dispersion within the lactiferous sinus.

The volume of the inert gas used to infuse the medicament throughout the udder may vary from about 50 cc. up to 3,000 cc., at atmospheric pressure, for each quarter treated. Although the suspension of the medicament in the inert gas may be introduced into the udder by any convenient means, the preferred means is by use of a pressure container which holds the inert gas and medicament at pressures up to about 90 pounds per square inch. A suitable valve and cannula are provided. Preferably the pressurized container is relatively small having a capacity of about 8 fluid ounces although larger sizes may be used. If desired, the compressed gas and medicament may be in smaller containers, for example, 2 to 4 fluid ounces which are particularly useful for the treatment of smaller animals such as sheep and goats.

The inert gas should be one which is nonirritating to the delicate tissue of the mammary gland. Carbon dioxide and nitrogen are preferred. However, various other compressed gases, including air and the fluorinated hydrocarbon propellants commonly used in aerosol bombs, may also be used as means of inflating the udder and infusing the medicament throughout the mammary gland.

Among the antibiotics that may be used in the treatment of bovine mastitis in accordance with the present invention may be mentioned penicillin, neomycin, bacitracin, streptomycin, dihydrostreptomycin, oxytetracycline, chlortetracycline, tetracycline, polymyxin, tyrothricin, erythromycin, oleandomycin, tylosin, colimycin, and rifamycin. Various sulfa drugs such as sulfanilamide and sulfadiazine; nitrofurans such as nitrofurazone; quaternary ammonium compounds; and various other commonly recognized antibacterial agents effective against microorganisms causing mastitis can be employed in practicing the present invention. It is often of advantage to include a steroid such as cortisone, hydrocortisone, prednisone, prednisolone, and the like in the aerosol with the antibacterial agent. These medicinal agents should have a particle size within the range of 0.005 micron to 5 microns. The amounts used in treating each quarter will be, in general, the same as are now used in treating mastitis with injectable ointments.

It is preferred that the medicinal agent be of a noncaking type so that when the inert gas is blown into the udder, the drug will be carried with it and exhausted completely from the pressurized container. In the case of those drugs which have a natural tendency to agglomerate or cake, the free flowing properties of the micronized antibacterial agent may be maintained by adding to the powder mixture small amounts of an anticaking agent such as a colloidal amorphous silicon dioxide, finely divided crystalline silica, starch, lactose, or the like. The amounts of the anticaking agents should be as small as possible to avoid infusing the udder with a non-medication which might be a source of inflammation. Micronized silicas which are sold under a variety of trade names may be used as anticaking agents for the medication.

When the medication is of a type or in a form that may lead to caking in the pressurized container, the container should be selected from kinds available which are so constructed as to deliver powdered materials. One suitable type is characterized by having a compartment holding the micronized medicaments with the outflowing gas passing through the compartment in which the powder is stored as the gas is released.

*Example*

A medicament consisting of 150 milligrams of micronized nitrofurazone, 50.8 milligrams (50,000 units of procaine penicillin G), and 24.2 milligrams of finely divided amorphous silica, sold under the trade name "Quso F–20," were placed in a 16-ounce aerosol can fitted with a Risdon valve, Model 5832–99, with an 0.035 inch orifice stem. Carbon dioxide was added to the can containing the medication until the pressure reached 90 pounds per square inch. The contents of such a pressurized container were infused into the left rear quarter of a purebred Holstein cow with the aid of a plastic teat cannula which was fitted over the metal sleeve of the valve of the container.

This left rear quarter was infused with a similar dust aerosol after each of three consecutive milkings. The irritant effect of the treatment was determined by measuring leukocyte response with Breed's technique of cell enumeration (neutrophils per milliliter of milk).

Cell counts from each of the four foremilk samples were made after initiation of the treatment until the conclusion of the experiment. In this case there was no indication of physical irritation exhibited by the cow, the treated gland, or the resulting milk production. Crepitations were palpable up to forty-eight hours after the last treatment indicating a residual presence of carbon dioxide. Leukocyte response was pronounced in the treated quarter. However, the leukocyte count gradually declined indicating a transitory inflammation. Milk production was not adversely effected as a result of the treatment. No residues of the medicament were found in the milk after a period of twenty-four hours.

As stated above, the volume of the inert gas infused into each quarter of an infected udder may vary from about 50 cc. up to 3,000 cc. measured at atmospheric pressure. These volumes are readily held in pressurized containers of the aerosol type mentioned above. The pressure should not exceed about 90 pounds per square inch. A conventional 16-ounce container having an actual working capacity of 520 cc. can hold 3,000 cc. of carbon dioxide at a pressure of approximately 85 pounds per square inch. The 8-ounce pressurized containers can hold approximately 1800 cc. of carbon dioxide gas at a pressure of 90 pounds per square inch. Lower pressures can be used with larger sized containers. The volume and pressure relationships are readily calculated and may vary with the intended treatment.

What is claimed is:

1. A method of treating mastitis which comprises inflating the infected lactiferous sinus with 50 to 3,000 cc. of an inert gas having in suspension an effective amount of a medicament effective for treating mastitis of a particle size within the range of 0.005 to 5 microns.

2. The method in accordance with claim 1 in which the inert gas is carbon dioxide.

3. The method in accordance with claim 1 in which the medicament comprises a therapeutically effective nitrofuran.

4. The method in accordance with claim 1 in which the therapeutic agent comprises procaine penicillin.

5. The method in accordance with claim 1 in which the medicament comprises a therapeutically effective sulfonamide.

6. A method of treating mastitis in cattle which comprises introducing into an infected quarter of the udder 1,000 to 3,000 cc. of carbon dioxide gas carrying in suspension an effective amount of an antibacterial agent effective for treating mastitis having a particle size within the range 0.005 to 5 mircons.

References Cited

UNITED STATES PATENTS

| | | | |
|---|---|---|---|
| 2,861,024 | 11/1958 | Silver | 167—53.2 |
| 3,135,658 | 6/1964 | Hanus et al. | 167—53.2 |

OTHER REFERENCES

Veterinary Bulletin, vol. 23, 1953, page 2 (Item 6).

SAM ROSEN, *Primary Examiner.*